(12) United States Patent
Wilson et al.

(10) Patent No.: US 9,580,535 B2
(45) Date of Patent: Feb. 28, 2017

(54) PREPARATION OF AMPHIPHILIC BLOCK POLYMERS BY CONTROLLED RADICAL MICELLAR POLYMERISATION

(71) Applicant: RHODIA OPERATIONS, Aubervilliers (FR)

(72) Inventors: James Wilson, Coye la Foret (FR); Mathias Destarac, Toulouse (FR); Arnaud Cadix, Saint-Ouen (FR)

(73) Assignee: RHODIA OPERATIONS, Paris (FR)

( * ) Notice: Subject to any disclaimer, the term of this patent is extended or adjusted under 35 U.S.C. 154(b) by 111 days.

(21) Appl. No.: 14/353,360

(22) PCT Filed: Oct. 24, 2012

(86) PCT No.: PCT/EP2012/071079
§ 371 (c)(1),
(2) Date: Apr. 22, 2014

(87) PCT Pub. No.: WO2013/060741
PCT Pub. Date: May 2, 2013

(65) Prior Publication Data
US 2014/0378617 A1 Dec. 25, 2014

(30) Foreign Application Priority Data

Oct. 24, 2011 (FR) .................................... 11 03246
Dec. 5, 2011 (FR) .................................... 10 03707

(51) Int. Cl.
*C08F 2/38* (2006.01)
*C08F 297/02* (2006.01)
*C08F 293/00* (2006.01)
*C09K 8/04* (2006.01)
*C09K 8/588* (2006.01)
*C09K 8/88* (2006.01)

(52) U.S. Cl.
CPC ............ *C08F 297/026* (2013.01); *C08F 2/38* (2013.01); *C08F 293/005* (2013.01); *C09K 8/04* (2013.01); *C09K 8/588* (2013.01); *C09K 8/882* (2013.01); *C08F 2438/03* (2013.01)

(58) Field of Classification Search
CPC .............................. C08F 2/38; C08F 2438/03
See application file for complete search history.

(56) References Cited

U.S. PATENT DOCUMENTS

| 4,432,881 A | 2/1984 | Evani |
| 4,584,358 A | 4/1986 | McCormick et al. |
| 6,150,468 A * | 11/2000 | Schoenberg ............ C08F 2/24 525/222 |
| 6,153,705 A | 11/2000 | Corpart et al. |
| 6,207,711 B1 * | 3/2001 | Matsumoto ............ A61K 8/63 424/401 |
| 6,207,771 B1 * | 3/2001 | Larson ...................... C08F 2/22 526/213 |
| 6,777,513 B1 | 8/2004 | Destarac et al. |
| 6,812,291 B1 | 11/2004 | Corpart et al. |
| 2001/0034428 A1 | 10/2001 | Destarac et al. |
| 2002/0198347 A1 | 12/2002 | Adam et al. |
| 2005/0054794 A1 | 3/2005 | Destarac et al. |
| 2010/0168338 A1 * | 7/2010 | Guerret ............... C08F 293/005 525/204 |

FOREIGN PATENT DOCUMENTS

| EP | 0801137 A1 | 10/1997 |
| FR | 2794464 A1 | 12/2000 |
| WO | WO 9630421 A1 | 10/1996 |
| WO | WO 9801478 A1 | 1/1998 |
| WO | WO 9858974 A1 | 12/1998 |
| WO | WO 9931144 A1 | 6/1999 |
| WO | WO 9935177 A1 | 7/1999 |
| WO | WO 9935178 A1 | 7/1999 |
| WO | WO 0075207 A1 | 12/2000 |
| WO | WO 0116187 A1 | 3/2001 |
| WO | WO 0142312 A1 | 6/2001 |
| WO | WO 0226836 A2 | 4/2002 |
| WO | WO 02090409 A2 | 11/2002 |
| WO | WO 03068827 A1 | 8/2003 |
| WO | WO 03068848 A2 | 8/2003 |
| WO | WO 2005021612 A1 | 3/2005 |
| WO | WO 2008046156 A1 | 4/2008 |

OTHER PUBLICATIONS

Regalado et al. Macromolecules 1999, 32, 8580-8588.*
Blagodatskikh, I.V. et al.—"New approach to the molecular characterization of hydrophobically modified polyacrylamide", Polymer (2004) vol. 45, No. 17, Aug. 5, 2004—pp. 5897-5904 (8 pages) XP004546874.
Kujawa, P. et al.—"Micellar synthesis and properties of hydrophobically associating polyampholytes" Macromolecular Chemistry and Physics (2001), vol. 202, pp. 1384-1397 (14 pages).

* cited by examiner

*Primary Examiner* — Mark Kaucher
(74) *Attorney, Agent, or Firm* — Vorys, Sater, Seymour and Pease LLP

(57) ABSTRACT

The present invention relates to the preparation of block copolymers, which can be used in particular as rheology agents, suitable, inter alia, for oil extraction, comprising a step of radical micellar polymerization wherein the following are brought into contact in an aqueous medium: —hydrophilic monomers, dissolved or dispersed in the aqueous medium; —hydrophobic monomers in the form of a micellar solution, i.e. containing, in a dispersed state, micelles comprising these hydrophobic monomers; —at least one radical polymerization initiator; and —at least one radical polymerization control agent. The polymers obtained according to the invention can be used in particular for enhanced oil recovery (EOR).

16 Claims, 1 Drawing Sheet

Polymer of Example 12

Polymer of Example 13

PREPARATION OF AMPHIPHILIC BLOCK POLYMERS BY CONTROLLED RADICAL MICELLAR POLYMERISATION

CROSS-REFERENCE TO RELATED APPLICATIONS

This application is a U.S. national stage entry under 35 U.S.C. §371 of international Application No. PCT/EP2012/071079 filed Oct. 24, 2012, which claims priority to French Application No. 11.03246 filed on Oct. 24, 2011 and French Application No. 11.03707 filed on Dec. 5, 2011, the whole content of these applications being herein incorporated by reference for all purposes.

TECHNICAL FIELD OF THE INVENTION

The present invention relates to a particular polymerization process, which gives access to amphiphilic block polymers that have a specific controlled structure, namely, schematically, based on a backbone formed from hydrophilic units (water-soluble or water-dispersible units) interrupted at various places with small hydrophobic blocks, these hydrophobic blocks all being of substantially identical size and present substantially in the same number and proportion on all the polymer chains. The invention also relates to amphiphilic polymers of controlled structure obtained according to this method, the mean molar mass of which may be finely controlled by means of the preparation method of the invention, and which may be used, especially as associative thickeners, surfactants or surface modifiers.

BACKGROUND OF THE INVENTION

To obtain water-soluble or water-dispersible polymers including hydrophobic blocks, one currently known method is that known as "micellar radical polymerization". Examples of micellar polymerization have been described especially in U.S. Pat. No. 4,432,881 or in *Polymer*, vol. 36, No. 16, pp. 3197-3211 (1996), to which reference may be made for further details.

According to the particular technique of "micellar radical polymerization", which will be referred to as "micellar polymerization" for the purposes of brevity in the rest of the description, block polymers of multiblock type are synthesized by copolymerization of hydrophilic monomers and hydrophobic monomers in an aqueous dispersing medium (typically water or a water/alcohol mixture) which comprises:
  hydrophilic monomers in dissolved form or dispersed in said medium; and
  hydrophobic monomers in surfactant micelles formed in said medium by introducing therein this surfactant at a concentration above its critical micelle concentration (cmc).

According to a particular embodiment, the hydrophobic monomers present in the surfactant micelles used in micellar polymerization may be monomers, which themselves have the property of forming micelles without the need to add additional surfactants (monomers referred to as "self-micellizable" in the rest of the description). According to this particular embodiment, the surfactant used may be the self-micellizable hydrophobic monomer itself, used without any other surfactants, although the presence of an additional surfactant of this type is not excluded. Thus, for the purposes of the present description, when mention is made of hydrophobic monomers in surfactant micelles, this notion encompasses both (i) hydrophobic monomers present in surfactant micelles other than these monomers, and (ii) monomers comprising at least one hydrophobic part or block and forming by themselves the micelles in aqueous medium. The two abovementioned modes (i) and (ii) are compatible and may coexist (hydrophobic monomers in micelles formed with another self-micellizable monomer, for example, or alternatively micelles comprising a combination of surfactants and of self-micellizable monomers).

In micellar polymerization, the hydrophobic monomers contained in the micelles are said to be in "micellar solution".

The micellar solution to which reference is made is a micro-heterogeneous system that is generally isotropic, optically transparent and, thermodynamically stable.

It should be noted that a micellar solution of the type used in micellar polymerization should be distinguished from a microemulsion. In particular, in contrast with a microemulsion, a micellar solution is formed at any concentration exceeding the critical micelle concentration of the surfactant used, with the sole condition that the hydrophobic monomer is soluble at least to a certain extent in the internal space of the micelles. A micellar solution moreover differs from an emulsion by the absence of an internal homogeneous phase: micelles contain a very small number of molecules (typically less than 1000, in general less than 500 and typically from 1 to 100, most usually with 1 to 50 monomers and not more than a few hundred surfactant molecules when a surfactant is present) and the micellar solution generally has physical properties similar to those of the surfactant micelles without monomers. Moreover, usually, a micellar solution is transparent with respect to visible light, given the small size of the micelles, which do not bring about refraction, unlike the drops of an emulsion, which refract light and give it its characteristic cloudy or white appearance.

The micellar polymerization technique leads to characteristic block polymers which each contain several hydrophobic blocks of substantially the same size, in which this size may be controlled. Specifically, given the confinement of the hydrophobic monomers in micelles, each of the hydrophobic blocks formed, of controlled, size, contains substantially a defined number $n_H$ of hydrophobic monomers, this number $n_H$ being able to be calculated as follows (Macromolecular Chem. Physics, 202, 8, 1384-1397, 2001):

$$n_H = N_{agg} \cdot [M_H]/([\text{surfactant}] - cmc)$$

where:
  $N_{agg}$ is the aggregation number of the surfactant, which reflects the number of surfactants present in each micelle
  $[M_H]$ is the molar concentration of hydrophobic monomer in the medium, and
  [surfactant] is the molar concentration of surfactant in the medium
  cmc is the critical micelle (molar) concentration.

The micellar polymerization technique thus enables advantageous control of the hydrophobic units introduced into the formed polymers, namely:
  overall control of the mole fraction of hydrophobic units in the polymer (by modulating the concentration ratio of the two monomers); and
  a more specific control of the number of hydrophobic units present in each of the hydrophobic blocks (by modifying the parameters influencing the $n_H$ defined above).

The multiblock polymers obtained by micellar polymerization also have an associative nature, which makes them, in absolute terms, good candidates for applications as viscosity enhancers.

However, as a general rule, micellar polymerization leads to polymer chains of highly non-homogeneous size. Specifically, although they allow fine control of the size of the hydrophobic blocks, the current micellar polymerization techniques lead to more erratic polymerization of the hydrophilic monomer units. Thus, the micellar polymerization processes currently known lead to polymer chains often comprising high heterogeneity in terms of composition, with, as a general rule, a highly polydispersed molecular mass distribution, without possible predefinition of the mean molecular mass Mn obtained. This inhomogeneity is especially revealed in the abovementioned article *Polymer*, vol. 36, No. 16, pp. 3197-3211 (1996).

Furthermore, the microstructure of the polymers obtained (i.e. the distribution of the hydrophobic blocks in the various chains) is not controlled, which is due especially to the very short lifetimes of the propagating chains relative to the overall polymerization time, combined with the differences in reactivity of the propagating active centres with respect to the hydrophilic monomers and the hydrophobic monomers (and also to their differences in concentration).

In other words, micellar polymerization does indeed make it possible, in the most general case, to integrate hydrophobic blocks of controlled size into hydrophilic chains, which makes it possible to synthesize self-associative polymers, but without controlling the overall size of the polymers synthesized or the microstructure of these polymers, which does not allow fine control of the properties of these self-associative polymers.

Moreover, the absence of control of the microstructure does not allow sufficiently fine modulation and control of the properties of polymers synthesized by micellar polymerization. Furthermore, it prevents access to copolymers of controlled architecture.

In addition, micellar polymerization processes are generally limited to extremely dilute systems to enable the addition and mixing of reagents. The molecular masses obtained in micellar radical polymerization are generally of the order of 500 000 to 5 000 000 g/mol, for example from 500 000 to 3 000 000.

To reduce the composition drift in polymers derived from micellar polymerization, a process of semi-continuous addition of hydrophobic monomers was proposed in U.S. Pat. No. 6,207,771. Although interesting, this process does not, however, allow effective control of the microstructure and does not at all control the molecular masses.

One aim of the present invention is to provide block polymers comprising hydrophobic blocks of controlled size, of the type obtained in standard micellar polymerization, but improving the control of the mean molecular mass of the chains synthesized and also allowing control of the microstructure of polymers, i.e. homogeneity, from one polymer chain to another, of the distribution of the hydrophobic blocks in the hydrophilic backbone.

SUMMARY OF THE INVENTION

To this end, according to a first aspect, one subject of the present invention is a process for preparing a block copolymer, which comprises a step (E) of micellar radical polymerization in which the following are placed in contact, in an aqueous medium (M):

hydrophilic monomers, dissolved or dispersed in said aqueous medium (M);

hydrophobic monomers in the form of a micellar solution, i.e. containing, in dispersed form in the medium (M), micelles comprising these hydrophobic monomers (this dispersed state being able especially to be obtained by means of at least one surfactant);

at least one radical polymerization initiator, this initiator typically being water-soluble or water-dispersible; and at least one radical polymerization control agent.

The aqueous medium (M) used in step (E) is a medium comprising water, preferably to a proportion of at least 50% by mass, or even at least 80%, for example at least 90%, or even at least 95%. This aqueous medium may optionally comprise solvents other than water, for example a water-miscible alcohol. Thus, the medium (M) may be, for example, an aqueous-alcoholic mixture. According to a possible variant, the medium (M) may comprise other solvents, preferably in a concentration in which said solvent is water-miscible, which may especially make it possible to reduce the amount of stabilizing surfactants used. Thus, for example, the medium (M) may comprise pentanol, or any other additive for modulating the aggregation number of the surfactants. In general, it is preferable for the medium (M) to be a continuous phase of water consisting of one or more solvents and/or additives that are miscible with each other and in water in the concentrations at which they are used.

For the purposes of the present description, the term "radical polymerization control agent" means a compound that is capable of extending the lifetime of the growing polymer chains in a polymerization reaction and of giving the polymerization a living or controlled nature. This control agent is typically a reversible transfer agent as used in controlled radical polymerizations known under the terminology RAFT or MADIX, which typically use a process of reversible addition-fragmentation transfer, such as those described, for example, in WO96/30421, WO 98/01478, WO 99135178, WO 98/58974, WO 00/75207, WO 01/42312, WO 99/35177, WO 99/31144, FR2794464 or WO 02/26836.

According to an advantageous embodiment, the radical polymerization control agent used in step (E) is a compound which comprises a thiocarbonylthio group —S(C=S)—. Thus, for example, it may be a compound which comprises a xanthate group (bearing —SC=S—O— functions), for example a xanthate. Other types of control agent may be envisioned (for example of the type used in CRP or ATRP).

According to a particular embodiment, the control agent used in step (E) may be a polymer chain derived from a controlled radical polymerization and bearing a group that is capable of controlling a radical polymerization (polymer chain of "living" type, which is a type that is well known per se). Thus, for example, the control agent may be a polymer chain (preferably hydrophilic or water-dispersible) functionalized at the chain end with a xanthate group or more generally comprising a group —SC=S—, for example obtained, according to the MADIX technique.

Alternatively, the control agent used in step (E) is a non-polymer compound bearing a group that ensures control of the radical polymerization, especially a thiocarbonylthio group —S(C=S)—.

DETAILED DESCRIPTION OF THE INVENTION

Figure 1:
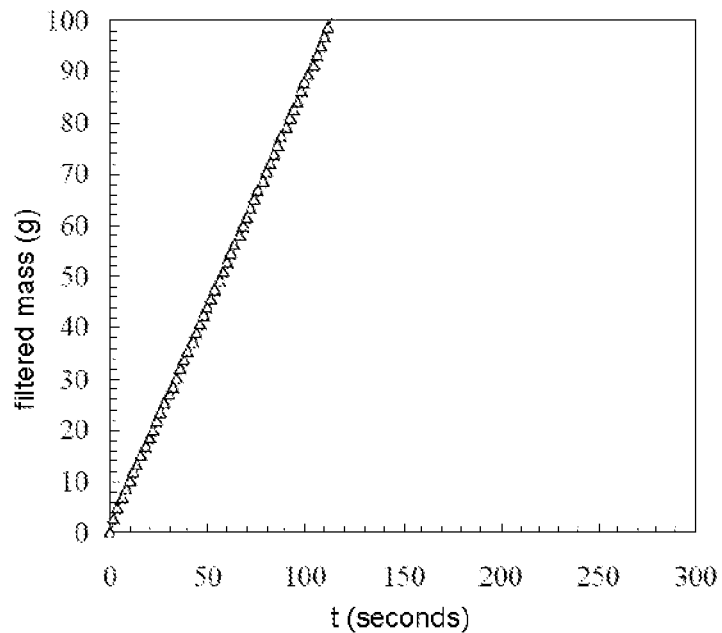
FIGS. 1 and 2 illustrate the change in collected masses as a function of time for the solutions containing 0.2% of polymers of Examples 12 and 13 during filtration at 60° C. (referred to as the filtered masses).

The studies that were performed by the inventors in the context of the present invention have now made it possible to demonstrate that a micellar radical polymerization performed in the presence of a radical polymerization control agent of the abovementioned type leads, in addition to the advantages generally observed in micellar polymerization (namely (i) control of the mole fraction of hydrophobic units in the polymers; and (ii) control of the number of hydrophobic units in each hydrophobic block), to:
control of the mean molecular mass; and
control of the distribution of the hydrophobic blocks in the various chains;
production of polymer chains of living nature, offering the possibility of preparing complex polymers of controlled architecture.

This effect is most particularly marked when the control agent used is a compound that is soluble or dispersible in the aqueous medium (M) used in step (E), and/or when this control agent is not capable of penetrating into the micelles of the micellar solution. This effect may also be observed in the case where the control agent is not soluble/dispersible in the medium (M) or when the control agent is capable of penetrating into the micelles.

According to a particular variant, the radical polymerization control agent used in step (E) is a polymer, advantageously an oligomer, of water-soluble or water-dispersible nature and bearing a thiocarbonylthio group —S(C=S)—, for example a xanthate group —SC=S—O—. This polymer, which is capable of acting both as a polymerization control agent and as a monomer in step (E), is also referred to as a "prepolymer" in the rest of the description. Typically, this prepolymer is obtained, by radical polymerization of hydrophilic monomers in the presence of a control agent bearing a thiocarbonylthio group —S(C=S)—, for example a xanthate. Thus, for example, according to an advantageous embodiment that is illustrated at the end of the present description, the control agent used in step (E) may advantageously be a prepolymer bearing a thiocarbonylthio group —S(C=S)—, for example a xanthate group —SC=S—O—, obtained after a step (E⁰) of controlled radical polymerization prior to step (E). In this step (E⁰), hydrophilic monomers; advantageously identical to those used in step (E); a radical polymerization initiator; and a control agent bearing a thiocarbonylthio group —S(C=S)—, for example a xanthate, can typically be placed in contact.

The use of the abovementioned step (E⁰) prior to step (E) makes it possible, schematically, to hydrophilize a large number of control agents bearing thiocarbonylthio functions (for example xanthate, which are rather hydrophobic by nature), by converting them from prepolymers that are soluble or dispersible in the medium (M) of step (E). Preferably, a prepolymer synthesized in step (E⁰) has a short polymer chain, for example comprising a sequence of less than 50 or even less than 25 monomer units, for example between 2 and 15.

Unexpectedly, it turns out that the conditions of step (E) make it possible to combine the advantages both of controlled radical polymerization and of micellar polymerization. In this context, the inventors have in particular now demonstrated that the presence of micelles in the polymerization medium does not affect the action of the control agents, which make it possible to perform a controlled polymerization of the monomers present in the aqueous medium in a similar manner to a controlled radical polymerization performed in homogeneous medium, thus making it possible very readily to predict and control the mean molar mass of the synthesized polymer (this mass is proportionately higher the smaller the initial concentration of control agent in the medium, this concentration dictating the number of growing polymer chains). At the same time, the presence of the control agent is not harmful either to the advantageous effect observed in polymerization, namely the precise control of the size of the hydrophobic blocks.

In addition to this control of polymerization of the monomers, which is not obtained in the more usual micellar polymerization processes, the implementation of step (E) of the process of the invention also makes it possible, again entirely surprisingly, to gain access to polymers of both high and controlled size, which proves to be very particularly unexpected in the light of the maximum sizes that can be obtained at the present time using controlled radical polymerization or micellar radical polymerization methods in the absence of control agents.

Under the conditions of step (E), it proves to be possible to control the number-average molar mass of the polymers up to very high values; thus, according to a particular embodiment, the polymers synthesized according to the process of the invention may have a molecular mass of greater than 300 000 g/mol. In particular, by adjusting the initial concentration of control agent in the medium (M), step (E) may typically lead to the synthesis of a block polymer having a molecular mass Mn of greater than 400 000 g/mol. According to an advantageous embodiment of the process of the invention, in step (E), the initial concentration of control agent in the medium is chosen such that the synthesized hydrophilic polymer block average molecular mass has a number-average molecular mass Mn of greater than or equal to 500 000 g/mol, for example between 500 000 and 1 000 000 g/mol, sizes of up to 2 000 000 possibly being achieved.

The process of the invention also makes it possible to prepare polymers of lower masses. According to an advantageous embodiment, the synthesized polymer is a polymer with a mass of between 1000 and 100 000 g/mol and preferably between 2000 and 25 000 g/mol. Typically, such polymers of low masses may be obtained at a concentration below their critical overlap concentration. On account of their small sizes, such polymers can diffuse at the interfaces and participate in modifying the properties of these interfaces or surfaces.

Irrespective of the size of the polymers synthesized in step (E), these polymers also have a highly controlled microstructure, with chains that are substantially all similar, comprising hydrophobic blocks substantially distributed in the same manner from one polymer chain to another. This homogeneity of the distribution of the hydrophobic blocks from one chain to another makes it possible to obtain a polymer population all having similar properties, which makes it possible to provide compositions having perfectly targeted and reproducible properties, which constitute an advantage for certain applications of polymers, for example when it is sought to use them to obtain a precisely metered viscosity-enhancing effect. The polymers obtained according to the invention are distinguished in this from the polymers generally obtained in micellar polymerization, which most usually have a very broad and very heterogeneous distribution of the hydrophobic blocks in the various chains.

Thus, the use of step (E) affords access to particularly novel and advantageous polymers. According to a second aspect, these polymers constitute another subject of the present invention. Given the implementation of the conditions of step (E), these polymers usually have a linear structure, with hydrophobic blocks localized on a monotonous gradient, i.e. of constantly decreasing or constantly increasing concentration from the start to the end of the polymer chain in formation, which is especially explained by the fact that the hydrophobic monomers present in the micellar solution become depleted over time.

The polymers obtained according to the present invention may be used, in many fields. They may be used most particularly as surfactants and/or rheology modifiers, especially as viscosity enhancers or thickeners, in particular in aqueous media.

According to a third aspect, a subject of the invention is also this particular use of the specific polymers obtained according to the invention. A subject of the invention is also processes for modifying aqueous media using these polymers as rheology modifiers. The invention also relates to aqueous compositions comprising the polymers according to the invention, which may be used especially for exploiting oil and/or gas reservoirs. A subject of the invention is also methods using aqueous compositions of this type for exploiting oil and/or gas reservoirs, especially methods using circulation or placement of such a composition in a well.

The specific polymers obtained according to the invention may also be used for performing surface functionalizations (hydrophilization or hydrophobization depending on the nature of the surface, given the amphiphilic nature of the polymers), stabilization of interfaces of oil/water or water/gas type.

Various features and embodiments of the invention will now be described in greater detail.

Radical Polymerization Control Agent

The control agent used in step (E) or, where appropriate, in step ($E^0$) of the process of the invention is advantageously a compound bearing a thiocarbonylthio group —S(C=S)—. According to a particular embodiment, the control agent may bear several thiocarbonylthio groups. It may optionally be a polymer chain bearing such a group.

Thus, this control agent may, for example, correspond to formula (A) below:

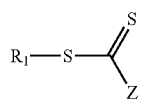

(A)

in which:
Z represents:
  a hydrogen atom,
  a chlorine atom,
  an optionally substituted alkyl or optionally substituted aryl radical,
  an optionally substituted heterocycle,
  an optionally substituted alkylthio radical,
  an optionally substituted arylthio radical,
  an optionally substituted alkoxy radical,
  an optionally substituted aryloxy radical,
  an optionally substituted amino radical,
  an optionally substituted hydrazine radical,
  an optionally substituted alkoxycarbonyl radical,
  an optionally substituted aryloxycarbonyl radical,
  an optionally substituted carboxyl or acyloxyl radical,
  an optionally substituted aryloxy radical,
  an optionally substituted carbamoyl radical,
  a cyano radical,
  a dialkyl- or diaryl-phosphonato radical,
  a dialkyl-phosphinato or diaryl-phosphinato radical, or
  a polymer chain,
and
$R_1$ represents:
  an optionally substituted alkyl, acyl, aryl, aralkyl, alkene or alkyne group,
  a saturated or unsaturated, aromatic, optionally substituted carbocycle or heterocycle, or
  a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—O$_2$OR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R representing an alkyl or aryl group, or a polymer chain.

For the control agents of formula (A) used in step (E), it is generally preferred for the group R1 to be of hydrophilic nature. Advantageously, it is a water-soluble or water-dispersible polymer chain.

The group R1 may alternatively be amphiphilic, i.e. it may have both hydrophilic and lipophilic nature. It is preferable for R1 not to be hydrophobic.

As regards the control agents of formula (A) used in step ($E^0$), $R_1$ may typically be a substituted or unsubstituted, preferably substituted, alkyl group. A control agent of formula (A) used in step ($E^0$) may nevertheless comprise other types of group $R_1$, especially a ring or a polymer chain.

The optionally substituted alkyl, acyl, aryl, aralkyl or alkyne groups generally contain 1 to 20 carbon atoms, preferably 1 to 12 and more preferentially 1 to 9 carbon atoms. They may be linear or branched. They may also be substituted with oxygen atoms, especially in the form of esters or sulfur or nitrogen atoms.

Among the alkyl radicals, mention may be made especially of methyl, ethyl, propyl, butyl, pentyl, isopropyl, tert-butyl, pentyl, hexyl, octyl, decyl or dodecyl radicals.

The alkyne groups are radicals generally containing from 2 to 10 carbon atoms, and contain at least one acetylenic unsaturation, such as the acetylenyl radical.

The acyl group is a radical generally containing from 1 to 20 carbon atoms with a carbonyl group.

Among the aryl radicals, mention may be made especially of the phenyl radical, optionally substituted especially with a nitro or hydroxyl function.

Among the aralkyl radicals, mention may be made especially of the benzyl or phenethyl radical, optionally substituted especially with a nitro or hydroxyl function.

When $R_1$ or Z is a polymer chain, this polymer chain may be derived from a radical or ionic polymerization or derived from a polycondensation.

Advantageously, compounds bearing a xanthate —S(C=S)O—, trithiocarbonate, dithiocarbamate or dithiocarbazate function, for example bearing an O-ethyl xanthate function of formula —S(C=S)OCH$_2$CH$_3$, are used as control agent for step (E), and also for step (E$^0$), where appropriate.

When step (E$^0$) is performed, it is especially advantageous to use as control agents in this step a compound chosen from xanthates, trithiocarbonates, dithiocarbamates and dithiocarbazates. Xanthates prove to be most particularly advantageous, especially those bearing an O-ethyl xanthate function —S(C=S)OCH$_2$CH$_3$, such as O-ethyl-S-(1-methoxycarbonylethyl) xanthate (CH$_3$CH(CO$_2$CH$_3$))S(C=S)OEt. Another possible control agent in step (E$^0$) is dibenzyltrithiocarbonate of formula PhCH$_2$S(C=S)SCH$_2$Ph (in which Ph=phenyl).

The living prepolymers obtained in step (E$^0$) using the abovementioned control agents prove to be particularly advantageous for performing step (E).

Hydrophilic Monomers

The process of the invention may be employed with a very large number of hydrophilic monomers.

Typically, the monomers may comprise monomers chosen from:
- ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
- esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
- α,β-ethylenically unsaturated monocarboxylic acid amides and the N-alkyl and N,N-dialkyl derivatives thereof such as acrylamide, methacrylamide, N-methyl (meth)acrylamide, N-ethyl(meth)acrylamide, N-propyl (meth)acrylamide, N,N-di methyl(meth)acrylamide, N,N-diethyl(meth)acrylamide, morpholinyl(meth)acrylamide and methylolacrylamide (acrylamide and N,N-dimethyl(meth)acrylamide prove to be particularly advantageous);
- N-vinyllactams and derivatives thereof, for example N-vinylpyrrolidone and N-vinylpiperidone;
- open-chain N-vinylamide compounds, for example N-vinylformamide, N-vinyl-N-methylformamide, N-vinylacetamide, N-vinyl-N-methylacetamide, N-vinyl-N-ethylacetamide, N-vinyipropionamide, N-vinyl-N-methylpropionamide and N-vinylbutyramide;
- esters of α,β-ethylenically unsaturated monocarboxylic and dicarboxylic acids with amino alcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate;
- amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide;
- N-diallylamines, N,N-diallyl-N-alkylamines, acid-addition salts thereof and quaternization products thereof, the alkyl used here preferentially being C1-C3-alkyl;
- N,N-diallyl-N-methylamine and N,N-diallyl-N,N-dimethylammonium compounds, for example the chlorides and bromides;
- nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;
- sulfobetaines; and
- mixtures and combinations of two or more of the abovementioned monomers.

According to a particular embodiment, these monomers may especially comprise acrylic acid (AA). According to a possible embodiment, the monomers are all acrylic acids, but it may also be envisioned to use as monomers a mixture comprising, inter alia, acrylic acid as a mixture with other hydrophilic monomers.

According to a preferential embodiment, the hydrophilic monomers of step (E) comprise (meth)acrylic acid and/or (meth)acrylamido monomers.

For the purposes of the present description, the term "(meth)acrylic acid" includes methacrylic acid, and acrylic acid, and mixtures thereof.

Similarly, for the purposes of the present description, the term "(meth)acrylate" includes methacrylate and acrylate, and mixtures thereof.

Similarly, for the purposes of the present description, the term "(meth)acrylamide/(meth)acrylamido" includes methacrylamide/methacrylamido and acrylamide/acrylamido, and mixtures thereof.

The monomers containing acid groups may be used for the polymerization in the form of the free acid or in partially or totally neutralized form. KOH, NaOH, ammonia or another base may be used, for example, for the neutralization.

According to another particular embodiment, the monomers used in the process of the invention are especially acrylic acid, methacrylic acid and/or salts thereof, and/or mixtures thereof.

According to another embodiment, the monomers used in step (E) comprise (and typically consist of) (meth)acrylamide monomers, or more generally (meth)acrylamido monomers, including:
- acrylamido monomers, namely acrylamide, the sulfonate derivative thereof (AMPS), quaternary ammonium (APTAC) and sulfopropyldimethylammoniumpropylacrylamide;
- methacrylamido monomers, such as sulfopropyldimethylammoniumpropylmethacrylamide (SPP) and sulfohydroxypropyldimethylammoniumpropylmethacrylamido.

According to a particular embodiment, the monomers of step (E) are acrylamides. An acrylamide used in step (E) is preferably an acrylamide that is not stabilized with copper. In the event of copper being present, it is preferable to introduce a copper-complexing agent such as EDTA, where appropriate preferably to a proportion of 20 to 2000 ppm. When acrylamides are used in step (E), they may typically be used in the form of powder or of an aqueous solution (optionally, but not necessarily, stabilized with hydroquinone monomethyl ether HQME, or alternatively with copper salts (preferably supplemented with EDTA, where appropriate)).

Irrespective of their exact nature, the monomers of step (E) may be used at relatively high concentrations, typically at concentrations that would be sufficient to ensure the formation of gel if step (E) were performed in the absence of a control agent. The inventors have now demonstrated, surprisingly, that the polymerization of step (E) can, if need be, be performed under conditions which correspond to that of gel polymerization, and without necessarily leading to gelation of the reaction medium during the polymerization, due to the presence of the control agent. Whether or not gelation of the medium is observed, step (E) allows a polymerization of controlled type, unlike a polymerization performed without an additional control agent.

Typically, the initial monomer concentration in the reaction medium of step (E) may range up to 40% by mass, or even up to 50% by mass, this concentration generally remaining less than 30% by mass relative to the total mass of the reaction medium. For example, the initial monomer concentration in the reaction medium of step (E) is between 0.5% and 35% and especially between 1% and 20% by mass relative to the total mass of the reaction medium.

According to a specific embodiment, the hydrophilic monomers used in step (E) are heat-sensitive macromonomers, which are insoluble in water beyond a certain temperature (the cloud point), but are soluble at lower temperature, step (E) being performed at a temperature below the cloud point. Macromonomers of this type typically have a polymerizable function of acrylamido type, and a side chain composed of ethylene oxide or propylene oxide sequences (random or in blocks), or alternatively based on N-isopropylacrylamide or N-vinylcaprolactam. This embodiment especially gives access to the preparation of polymers having heat-thickening properties, which may be used, for example, in the petroleum industry.

Preferably, in step (E), all the hydrophilic monomers are dissolved and/or dispersed in the aqueous medium (M).

Hydrophobic Monomers

These monomers, used in step (E) in the form of a micellar solution, i.e. containing, in dispersed form in the medium (M), micelles comprising these hydrophobic monomers. Provided that they can be incorporated into micelles of this type, any monomer of hydrophobic nature may be envisioned in step (E).

As nonlimiting examples of hydrophobic monomers that may be used according to the invention, mention may be made especially of:

vinylaromatic monomers such as styrene, α-methylstyrene, para-chloromethylstyrene, vinyltoluene, 2-methylstyrene, 4-methylstyrene, 2-(n-butyl)styrene or 4-(n-decyl)styrene (styrene proves to be especially advantageous);

halogenated vinyl compounds, such as vinyl or vinylidene halides, for instance vinyl or vinylidene chlorides or fluorides, corresponding to the formula $R_bR_cC{=}CX^1X^2$, where:
$X^1{=}$F or Cl
$X^2{=}$H, F or Cl
each one from among $R_b$ and $R_c$ represents, independently:
H, Cl, F; or
an alkyl group, preferably chlorinated and/or fluorinated, more advantageously perchlorinated or perfluorinated;

esters of α,β-ethylenically unsaturated monocarboxylic or dicarboxylic acid with C2-C30 alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethyl butyl (meth)acrylate, ethyl hexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleeyl (meth)acrylate, oleyl (meth)acrylate, linolyl (meth)acrylate, linolenyl (meth)acrylate, stearyl (meth)acrylate and lauryl (meth)acrylate, and mixtures thereof;

esters of vinyl or allyl alcohol with C1-C30 monocarboxylic acids, for example vinyl formate, vinyl acetate, vinyl propionate, vinyl butyrate, vinyl laurate, vinyl stearate, vinyl propionate or vinyl versatate, and mixtures thereof;

ethylenically unsaturated nitriles, such as acrylonitrile or methacrylonitrile, and mixtures thereof;

esters of α,β-ethylenically unsaturated monocarboxylic or dicarboxylic acids with C3-C30 alkanediols, for example 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated monocarboxylic and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl (meth)acrylamide, N-palmityl(meth)acrylamide, N-heptadecyl(meth)acrylamide, N-nonadecyl(meth)acrylamide, N-arachinyl(meth)acrylamide, N-behenyl(meth)acrylamide, N-lignoceryl(meth)acrylamide, N-cerotinyl(meth)acrylamide, N-melissinyl (meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide and N-lauryl(meth)acrylamide;

N-vinyllactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of α,β-ethylenically unsaturated monocarboxylic and dicarboxylic acids with amino alcohols, for example N,N-dimethylaminocyclohexyl (meth)acrylate;

amides of α,β-ethylenically unsaturated monocarboxylic and dicarboxylic acids with diamines comprising at least one primary or secondary amino group, such as N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide and N-[4-(dimethylamino)cyclohexyl]methacrylamide; and C2-C8 monoolefins and nonaromatic hydrocarbons comprising at least two conjugated double bonds, for example ethylene, propylene, isobutylene, isoprene or butadiene.

According to a preferential embodiment, the hydrophobic monomers used according to the invention may be chosen from:

α,β-unsaturated esters of C1-C30 alkyl and preferably of C4-C22 alkyl, in particular alkyl acrylates and methacrylates, for instance methyl, ethyl, butyl, 2-ethylhexyl, isooctyl, lauryl, isodecyl or stearyl acrylates or methacrylate (lauryl methacrylate in particular proves to be especially advantageous);

α,β-unsaturated amides of C1-C30 alkyl and preferably of C4-C22 alkyl, in particular alkyl acrylamides and methacrylamides, for instance methyl, ethyl, butyl, 2-ethylhexyl, isooctyl, lauryl, isodecyl or stearyl acrylamide or methacrylamide (laurylmethacrylamide in particular proves to be especially advantageous);

vinyl or allyl alcohol esters of saturated carboxylic acids, such as vinyl or allyl acetate, propionate, versatate or stearate;

α,β-unsaturated nitriles containing from 3 to 12 carbon atoms, such as acrylonitrile or acrylonitrile, α-olefins and conjugated dienes;

mixtures and combinations of two or more of the above-mentioned monomers.

Preferably, the micelles of the micellar solution of step (E) do not contain any monomers of hydrophilic or water-dispersible nature. Moreover, preferably, all the hydrophobic monomers used in step (E) are contained in micelles of the micellar solution.

Initiation and Implementation of the Radical Polymerizations of Steps (E) and (E⁰)

When it is used in step (E), the radical polymerization initiator is preferably water-soluble or water-dispersible. Besides this preferential condition, any radical polymerization initiator (source of free radicals) that is known per se and suited to the conditions chosen for these steps may be used in step (E) and step (E⁰) of the process of the invention.

Thus, the radical polymerization initiator used according to the invention may be chosen, for example, from the initiators conventionally used in radical polymerization. It may be, for example, one of the following initiators:

hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, laurayl peroxide, t-amyl peroxypivalate, t-butyl peroxypivalate, dicumyl peroxide, benzoyl peroxide, potassium persulfate, ammonium persulfate, azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide, 2,2'-azobis(2-methyl-N-[1,1-bis(hydroxymethyl)ethyl]propionamide), 2,2'-azobis[2-methyl-N-(2-hydroxyethyl) propionamide], 2,2'-azobis(isobutyramide) dihydrate, redox systems comprising combinations such as:

mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborates or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

Typically, the amount of initiator to be used is preferably determined such that the amount of radicals generated is not more than 50 mol % and preferably not more than 20 mol % relative to the amount of control agent or transfer agent.

Most particularly, in step (E), it generally proves to be advantageous to use a radical initiator of redox type, which has, inter alia, the advantage of not necessitating heating of the reaction medium (no thermal initiation) and for which the inventors have now also discovered that it proves to be suitable for the micellar polymerization of step (E).

Thus, the radical polymerization initiator used in step (E) may typically be a redox initiator, typically not necessitating heating for the thermal initiation thereof. It is typically a mixture of at least one oxidizing agent with at least one reducing agent.

The oxidizing agent present in this redox system is preferably a water-soluble agent. This oxidizing agent may be chosen, for example, from peroxides such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system is also preferably a water-soluble agent. This reducing agent may typically be chosen from sodium formaldehyde sulfoxylate (especially in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:

mixtures of water-soluble persulfates with water-soluble tertiary amines, mixtures of water-soluble bromates (for example alkali metal bromates) with water-soluble sulfites (for example alkali metal sulfites), mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborates or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

An advantageous redox system comprises (and preferably consists of) a combination of ammonium persulfate and sodium formaldehyde sulfoxylate.

In general, and in particular in the case of the use of a redox system of the ammonium persulfate/sodium formaldehyde sulfoxylate type, it proves to be preferable for the reaction medium of step (E) to be free of copper. In the case of copper being present, it is generally desirable to add a copper-complexing agent such as EDTA, in an amount capable of masking its presence.

Irrespective of the nature of the initiator used, the radical polymerization of step ($E^0$) may be performed in any suitable physical form, for example dissolved in water or in a solvent, for example an alcohol or THF, or as an emulsion in water ("latex" process), in bulk, where appropriate by controlling the temperature and/or the pH so as to make species liquids and/or soluble or insoluble.

After performing step (E), given the specific use of a control agent, polymers functionalized with transfer groups (living polymers) are obtained. This living nature makes it possible, if so desired, to use these polymers in a subsequent polymerization reaction, via a technique that is well known per se. Alternatively, if need be, it is possible to deactivate or destroy the transfer groups, for example by hydrolysis, ozonolysis, or reaction with amines, via means that are known per se. Thus, according to a particular embodiment, the process of the invention may comprise, after step (E), a step (E1) of hydrolysis, ozonolysis or reaction with amines, which is capable of deactivating and/or destroying all or some of the transfer groups present on the polymer prepared in step (E).

Surfactants

To prepare the micellar solution of the hydrophobic monomers used in step (E), any suitable surfactant may be used: in a nonlimiting manner, use may be made, for example, of surfactants chosen from the following list:

the ANIONIC SURFACTANTS may be chosen from:
alkyl ester sulfonates, for example of formula R—CH($SO_3M$)-$CH_2$COOR', or alkyl ester sulfates, for example of formula R—CH($OSO_3M$)-$CH_2$COOR', in which R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal cation, for example sodium, or the ammonium cation. Mention may be made most particularly of methyl ester sulfonates in which the radical R is $C_{14}$-$C_{16}$;

alkylbenzenesulfonates, more particularly of $C_9$-$C_{20}$, primary or secondary alkylsulfonates, especially of $C_8$-$C_{22}$, alkylglycerol sulfonates;

alkyl sulfates, for example of formula $ROSO_3M$, in which R represents a $C_{10}$-$C_{24}$ and preferably $C_{12}$-$C_{20}$ alkyl or hydroxyalkyl radical; M represents a cation of the same definition as above;

alkyl ether sulfates, for example of formula $RO(OA)_n SO_3M$ in which R represents a $C_{10}$-$C_{24}$ and preferably $C_{12}$-$C_{20}$ alkyl or hydroxyalkyl radical; OA representing an ethoxylated and/or propoxylated group; M representing a cation of the same definition as above, n generally ranging from 1 to 4, for instance lauryl ether sulfate with n=2;

alkylamide sulfates, for example of formula $RCONHR'OSO_3M$ in which R represents a $C_2$-$C_{22}$ and preferably $C_6$-$C_{20}$ alkyl radical, R' represents a $C_2$-$C_3$ alkyl radical, M representing a cation of the same definition as above, and also the polyalkoxylated (ethoxylated and/or propoxylated) derivatives thereof (alkylamido ether sulfates;

salts of saturated or unsaturated fatty acids, for instance of $C_8$-$C_{24}$ and preferably $C_{14}$-$C_{20}$, and of an alkaline-earth metal cation, N-acyl N-alkyltaurates, alkylisethionates, alkylsuccinamates and alkylsulfosuccinates, alkyl glutamates, sulfosuccinate monoesters or diesters, N-acyl sarcosinates and polyethoxycarboxylates;

monoester and diester phosphates, for example having the following formula: $(RO)_x—P(=O)(OM)_{x'}$ in which R represents an optionally polyalkoxylated alkyl, alkylaryl, arylalkyl or aryl radical, x and x' being equal to 1 or 2, on condition that the sum of x and x' is equal to 3, M representing an alkaline-earth metal cation;

the NONIONIC SURFACTANTS may be chosen from:
alkoxylated fatty alcohols, for example laureth-2, laureth-4, laureth-7, oleth-20, alkoxylated triglycerides, alkoxylated fatty acids, alkoxylated sorbitan esters, alkoxylated fatty amines, alkoxylated bis(1-phenylethyl)phenols, alkoxylated tris(1-phenylethyl)phenols, alkoxylated alkylphenols, products resulting from the condensation of ethylene oxide with a hydrophobic compound resulting from the condensation of propylene oxide with propylene glycol, such as the Pluronic products sold by BASF; products resulting from the condensation of ethylene oxide with the compound resulting from the condensation of propylene oxide with ethylenediamine, such as the Tetronic products sold by BASF; alkylpolyglycosides, such as those described in U.S. Pat. No. 4,565,647 or alkylglucosides; fatty acid amides, for example of $C_8$-$C_{20}$, especially fatty acid monoalkanolamides, for example cocamide MEA or cocamide MIPA;

the AMPHOTERIC SURFACTANTS (true amphoteric species comprising an ionic group and a potentially ionic group of opposite charge, or zwitterionic species simultaneously comprising two opposite charges) may be:

betaines in general, especially carboxybetaines, for example laurylbetaine (Mirataine BB from the company Rhodia) or octylbetaine or cocoylbetaine (Mirataine BB-FLA from Rhodia); amidoalkylbetaines, for instance cocamidopropylbetaine (CAPB) (Mirataine BDJ from the company Rhodia or Mirataine BET C-30 from Rhodia);

sulfobetaines or suitaines, for instance cocamidopropylhydroxysultaine (Mirataine CBS from the company Rhodia);

alkylamphoacetates and alkylamphodiacetates, for instance comprising a cocoyl or lauryl chain (Miranol C2M Conc. NP, C32, L32 especially, from the company Rhodia);

alkylamphopropionates or alkylamphodipropionates, (Miranol C2M SF);

alkylamphohydroxypropylsultaines (Miranol CS), alkylamine oxides, for example lauramine oxide (INCI);

the CATIONIC SURFACTANTS may be optionally polyethoxylated primary, secondary or tertiary fatty amine salts, quaternary ammonium salts such as tetraalkylammonium, alkylamidoalkylammonium, trialkylbenzylammonium, trialkylhydroxyalkylammonium or alkylpyridinium chlorides or bromides, imidazoline derivatives, and amine oxides of cationic nature. An example of a cationic surfactant is cetrimonium chloride or bromide (INCl);

the surfactants used according to the present invention may be block copolymers containing at least one hydrophilic block and at least one hydrophobic block different from the hydrophilic block, advantageously obtained according to a polymerization process in which:

($a_0$) at least one hydrophilic monomer (or, respectively, a hydrophobic monomer), at least one source of free radicals and at least one radical polymerization control agent of the type —S(C=S)— are placed in contact in an aqueous phase;

($a_1$) the polymer obtained after step ($a_0$) is placed in contact with at least one hydrophobic monomer (or, respectively, a hydrophilic monomer) different from the monomer used in step ($a_0$) and at least one source of free radicals;

via which a diblock copolymer is obtained.

Polymers of the triblock type, or comprising more blocks, may optionally be obtained by performing after step ($a_1$), a step ($a_2$) in which the polymer obtained after step ($a_1$) is placed in contact with at least one monomer different from the monomer used in step ($a_1$) and at least one source of free radicals; and more generally by performing (n+1) steps of the type such as the abovementioned steps ($a_1$) and ($a_2$) and n is an integer typically ranging from 1 to 3, in which, in each step ($a_n$), with n≥1: the polymer obtained after step ($a_{n-1}$) is placed in contact with at least one monomer different from the monomer used in step ($a_{n-1}$) and at least one source of free radicals. Use may be made, for example, according to the invention, of copolymers of the type described in WO 03/068 827, WO 03/068 848 and WO 2005/021 612.

Use of the Polymers of the Invention

The polymers obtained after step (E) and after the optional step (E1) described in the preceding paragraph are, inter alia, useful for regulating the rheology of liquid media, especially aqueous media. They may also be used as associative thickeners, as viscosity enhancers, gelling agents or surface modifiers, or for making nanohybrid materials. They may also be used as vectorizing agents.

In this context, a polymer according to the invention may especially be used for thickening or adapting the rheology of a very large number of compositions, for example of compositions for conveying cosmetic, pharmaceutical, veterinary or plant-protection principles, or alternatively as detergents, for example. Thus, a polymer according to the invention may be used, for example, for modifying the rheology of a cosmetic composition, of a household product, of a detergent composition or of the formulation intended for the agricultural field.

More specifically, the polymers as obtained according to the invention prove to be advantageous as rheology regulators in the field of extracting oil and natural gas. They may be used in particular for making drilling fluids, for fracturing, for stimulation or for enhanced oil recovery.

In the field of enhanced oil recovery (EOR), the polymers as obtained according to the process of the invention generally have rapid hydration capacity and also good injectivity and shear stability properties, especially given the controlled nature of the polymerization, which leads to polymer batches of homogeneous composition and, structure, with polydispersity indices that are lower than those of "uncontrolled" systems.

Moreover, the nature of the polymers that may be synthesized according to the present invention is extremely modulable, which permits a very wide choice both on the backbone and on the presence of substituents, which may be judiciously chosen as a function of the envisioned uses of the polymer.

For example, for application in EOR, it is advantageous for the constituent monomers of the polymer to give it resistance to high temperature. To this end, the polymers intended for use in EOR may be, for example, of the type obtained from monomers chosen from acrylamido, methacrylamido, vinyl or allylic monomers. It is generally not advantageous to use acrylates or methacrylates on account of their sensitivity toward hydrolysis. By way of example, to improve the thermal stability of the backbone, use may be made of monomers such as N-methylolacrylamide, dimethylacrylamide, N-morpholine acrylamide, vinylpyrrolidone, vinylamide, acrylamido derivatives such as AMPS or APTAC, sodium sytrenesulfonate and derivatives thereof, or sodium vinylsulfonate.

According to a specific embodiment, which is well suited to uses in the field of EOR, the polymers bear functionalities which ensure resistance to salts and which counteract the effects of loss of viscosity that are often encountered in EOR in the absence of such functionalities on the polymer. Polymers according to the invention that are stable with respect to salts may especially be synthesized by performing one or more of the following methods:

use of additional monomers of sodium 3-acrylamido-3-methylbutanoate type (for example according to the technique described in U.S. Pat. No. 4,584,358);

use of additional monomers of sulfonic acid or sulfonate type, for instance AMPS (acrylamidomethylpropanesulfonic acid), and salts thereof (especially sodium salts), or styrenesulfonate and salts thereof;

the polymers prepared may be of polyampholytic type with a hydrophilic backbone comprising a mixture (i) of monomer units bearing at least one negative charge (for example sulfonates of the abovementioned type); and (ii) of monomer units bearing at least one positive charge (for example APTAC, MAPTAC, Diquat, (methacryloamidopropylpentamethyl-1,3-propylene-2-olammonium dichloride), DADMAC (diallyldimethylammonium chloride), N-vinylformamide (amine precursor that is cationizable after hydrolysis), or vinylpyridine or a quaternized derivative thereof);

use of additional monomers of sulfobetaine type, for instance sulfopropyl dimethylammonium propyl acrylamide, sulfopropyl dimethylammonium propyl methacrylamide (SPP), sulfohydroxypropyldimethylammoniumpropylmethacrylamido (SHPP), 2-vinyl(3-sulfopropyl)pyridinium betaine, 4-vinyl(3-sulfopropyl) pyridinium betaine, 1-vinyl-3-(3-sulfopropyl) imidazolium betaine, or sulfopropylmethyldiallylammoniumbetaine.

Various aspects and advantages of the invention will be further illustrated by the examples below, in which the polymers were prepared according to the process of the invention.

EXAMPLES

In the examples that follow, the synthesis of the polymers was performed using:
- a solution A comprising a living poly(acrylamide) prepolymer P1, prepared under the conditions of step ($E^0$);
- a solution B which is a micellar solution of lauryl methacrylate (LMA) and of sodium dodecyl sulfate (SDS);
- a solution C which is a micellar solution of lauryl acrylate (LA) and of sodium dodecyl sulfate (SDS);
- a solution D which is a micellar solution of laurylmethacrylamide (LMAM) and of sodium dodecyl sulfate (SOS); or
- a solution E which is a micellar solution of LMAM and of sodium dodecyl sulfate (SDS), prepared under the following conditions:

Solution a Containing the Prepolymer P1:

40 g of an aqueous 50% acrylamide solution (free of copper), 29.9 g of distilled water, 8.25 g of O-ethyl-S-(1-methoxycarbonylethyl)xanthate $(CH_3CH(CO_2CH_3))S(C=S)OEt$, 26.6 g of ethanol and 0.537 mg of initiator V-50 (2,2'-azobis(2-methylpropionamidine) dihydrochloride) were placed in a 250 mL round-bottomed flask, at room temperature (20° C.).

The mixture was degassed by sparging with nitrogen for 30 minutes. The flask was then placed in an oil bath thermostatically maintained at 60° C. and the polymerization reaction was then left to proceed with stirring for 3 hours at 60° C.

100% conversion was obtained (determined by $^1$H NMR). The number-average molar mass of the prepolymer P1, determined by $^1$H NMR, is 750 g/mol.

The solvent was evaporated off under vacuum (rotavapor; 15 mbar, 50° C.) and dried for 120 minutes at 50° C. (solids content measured after this drying: 37%: 115° C., 60 min).

Distilled water was then added so as to obtain an approximately 40% solution of the prepolymer, referred to hereinbelow as SOLUTION A.

Solution B: Micellar Solution of LMA/SDS 146.2 g of a 30% SDS solution (nSDS=0.152 mol), 168.9 g of distilled water, 3.9 g of LMA (nLMA=0.0153 mol) and 5.4 g of sodium sulfate were placed in a 500 mL round-bottomed flask at room temperature (20° C.).

The mixture was stirred using a magnetic bar for 6 hours, until a clear micellar solution was obtained.

In this micellar solution, nH=(0.0153×62)/0.145=6.5 (nSDS-CMC=0.152-0.07=0.145; NAgg=62).

Solution C: Micellar Solution of LA/SDS 146.2 g of a 30% SDS solution (nSDS=0.152 mol), 169.0 g of distilled, water, 3.55 g of LA (nLA=0.0153 mol) and 5.4 g of sodium sulfate were placed in a 500 mL round-bottomed flask at room temperature (20° C.).

The mixture was stirred using a magnetic bar for 6 hours, until a clear micellar solution was obtained.

In this micellar solution, nH=(0.0153×62)/0.145=6.5 (nSDS-CMC=0.152-0.007=0.145; NAgg=62).

Solution D: Micellar Solution of LMAM/SDS 146.2 g of a 30% SDS solution (nSDS=0.152 mol), 169.19 of distilled water, 3.9 g of LMAM (nLMAM=0.0153 mol) and 5.4 g of sodium sulfate were placed in a 500 mL round-bottomed flask at room temperature (20° C.).

The mixture was heated to 60° C. and stirred using a magnetic bar for 2 hours, until a clear micellar solution was obtained.

In this micellar solution, nH=(0.0153×62)/0.145=6.5 (nSDS-CMC=0.152-0.007=0.145; NAgg=62).

Solution E: Micellar Solution of LMAM/SDS 146.2 g of a 30% SDS solution (nSDS=0.152 mol), 169.1 g of distilled water, 2.5 g of LMAM (nLMAM=0.0098 mol) and 5.4 g of sodium sulfate were placed in a 500 mL round-bottomed flask at room temperature (20° C.).

The mixture was heated to 60° C. and stirred using a magnetic bar for 2 hours, until a clear micellar solution was obtained.

In this micellar solution, nH=(0.0098×62)/0.145=4.2 (nSDS-CMC=0.152-0.007=0.145; NAgg=62).

In the examples below, the number-average molar mass of the synthesized polymers was compared, as a guide, with the theoretical number-average molar mass (Mnth), which would be obtained in the context of a perfectly controlled polymerization, which makes it possible to confirm the particularly well-controlled nature of the polymerization performed according to the invention, via radical means, as opposed to the results usually obtained when the conditions of a gel polymerization are used.

The theoretical number-average molar mass to which reference is made here is calculated according to the following formula:

$$\overline{Mn}(theo) = \frac{[M]_0}{[X]_0} \times M_{MU} \times Conv. + M_x$$

where:
- $Mn_{(theo)}$=theoretical number-average mass
- $[M]_0$=initial monomer concentration
- $[X]_0$=initial concentration of control agent
- $M_{MU}$=molar mass of the monomer
- Conv.=conversion of the monomer (reaction yield)
- $M_X$=molar mass of the control agent

COMPARATIVE EXAMPLE

Uncontrolled Micellar Polymerization

Poly(acrylamide/LMA) 97.5/2.5-nH 6.3

25 g of solution B, 6.54 g of an aqueous solution of acrylamide at 50% by mass and 3.14 g of ammonium persulfate (aqueous solution at 0.5% by mass) were placed in a 250 mL round-bottomed flask, at room temperature (20° C.). The mixture was degassed by sparging with nitrogen for 30 minutes. 3.138 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR). An analysis by steric exclusion chromatography in water supplemented with 100 mM NaCl, 25 mM $NaH_2PO_4$, 25 mM $Na_2HPO_4$ pH 7 buffer solution with a Malls 3 angle detector gives the following mass-average molar mass value ($M_W$):

$M_w$=>1 500 000 g/mol

The sample was very difficult to filter even at a concentration of 10 mg in 10 mL. The value is a mean of two injections and is therefore only one order of magnitude of the eluted fraction.

Example 1

Poly(Acrylamide/LMA) 97.5/2.5 mol % nH 6.3
Mnth 148 000 g/mol 50 g of solution B, 13.08 g of acrylamide (aqueous solution at 50% by mass), 0.088 g of Solution A and 3.14 g of ammonium persulfate (aqueous solution at 0.5% by mass) were placed in a 250 mL round-bottomed flask, at room temperature (20° C.). The mixture was degassed by sparging with nitrogen for 30 minutes. 3.138 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR).

The gel thus obtained was subjected to a basic hydrolysis. 2 g of gel and 8 g of distilled water were placed in a 100 ml round-bottomed flask at room temperature. The solution was adjusted to pH 10 by adding an NaOH solution at 50% by mass. The flask was then heated at 65° C. for 5 days. The polymer solution thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 3 angle detector gives the following mass-average molar mass value ($M_W$): 230 000 g/mol.

Example 2

Poly(Acrylamide/LMA) 97.5/2.5 mol % nH 6.3
Mnth 740 000 g/mol 50 g of solution B, 13.08 g of acrylamide (aqueous solution at 50% by mass), 0.018 g of Solution A and 3.14 g of ammonium persulfate (aqueous solution at 0.5% by mass) were placed in a 250 mL round-bottomed flask, at room temperature (20° C.). The mixture was degassed by sparging with nitrogen for 30 minutes. 3.138 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR).

The gel thus obtained was subjected to a basic hydrolysis. 2 g of gel and 8 g of distilled water were placed in a 100 ml round-bottomed flask at room temperature. The solution was adjusted to pH 10 by adding an NaOH solution at 50% by mass. The flask was then heated at 65° C. for 5 days. The polymer solution thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 3 angle detector gives the following mass-average molar mass value ($M_W$): 602 000 g/mol.

Example 3

Poly(Acrylamide/LMA) 97.5/2.5 mol % nH 6.3
Mnth 15 000 g/mol 50 g of solution B, 13.08 g of acrylamide (aqueous solution at 50% by mass), 0.88 g of Solution A and 6.26 g of ammonium persulfate (aqueous solution at 0.5% by mass) were placed in a 250 mL round-bottomed flask, at room temperature (20° C.). The mixture was degassed by sparging with nitrogen for 30 minutes. 6.26 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR).

The gel thus obtained was subjected to a basic hydrolysis. 2 g of gel and 8 g of distilled water were placed in a 100 ml round-bottomed flask at room temperature. The solution was adjusted to pH 10 by adding an NaOH solution at 50% by mass. The flask was then heated at 65° C. for 5 days. The polymer solution thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 3 angle detector gives the following mass-average molar mass value ($M_W$): 29 800 g/mol.

Example 4

Poly(Acrylamide/LMA) 97.5/2.5 mol % nH 6.3
Mnth 74 000 g/mol 50 g of solution B, 13.08 g of acrylamide (aqueous solution at 50% by mass), 0.176 g of Solution A and 6.26 g of ammonium persulfate (aqueous solution at 0.5% by mass) were placed in a 250 mL round-bottomed flask, at room temperature (20° C.). The mixture was degassed by sparging with nitrogen for 30 minutes. 6.26 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR).

The gel thus obtained was subjected to a basic hydrolysis. 2 g of gel and 8 g of distilled water were placed in a 100 ml round-bottomed flask at room temperature. The solution was adjusted to pH 10 by adding an NaOH solution at 50% by mass. The flask was then heated at 65° C. for 5 days. The polymer solution thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 3 angle detector gives the following mass-average molar mass value ($M_W$): 65 000 g/mol.

Example 5

Poly(Acrylamide/LMA) 97.5/2.5 mol % nH 6.3 Mnth 370 000 g/mol 50 g of solution B, 13.08 g of acrylamide (aqueous solution at 50% by mass), 0.035 g of Solution A and 6.26 g of ammonium persulfate (aqueous solution at 0.5% by mass) were placed in a 250 mL round-bottomed flask, at room temperature (20° C.). The mixture was degassed by sparging with nitrogen for 30 minutes. 6.26 g of sodium formaldehyde sulfoxylate in the form of an aqueous solution at 0.5% by mass were added to the medium, in a single portion. This aqueous solution of sodium formaldehyde sulfoxylate was degassed beforehand by sparging with nitrogen.

The polymerization reaction was then left to proceed with stirring for 24 hours at room temperature (20° C.).

After the 24 hours of reaction, 98% conversion was obtained (determined by $^1$H NMR).

The gel thus obtained was subjected to a basic hydrolysis. 2 g of gel and 8 g of distilled water were placed in a 100 ml round-bottomed flask at room temperature. The solution was adjusted to pH 10 by adding an NaOH solution at 50% by mass. The flask was then heated at 65° C. for 5 days. The polymer solution thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 3 angle detector gives the following mass-average molar mass value ($M_w$): 352 000 g/mol.

Example 6

Poly(Acrylamide/LA) 97.5/2.5 mol % nH 6.3 Mnth 10 000 g/mol 50 g of solution C, 13.17 g of acrylamide (aqueous solution at 50% by mass), 0.137 g of Rhodixan A1 and 6.32 g of ammonium persulfate (aqueous solution at 0.5% by mass) were placed in a 250 mL round-bottomed flask, at room temperature (20° C.). The mixture was degassed by sparging with nitrogen for 30 minutes. 6.32 g of sodium formaldehyde sulfoxylate in the form of an aqueous solution at 0.5% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 92% conversion was obtained (determined by $^1$H NMR).

The gel thus obtained was subjected to a basic hydrolysis. 25.0 g of gel and 27.4 g of distilled water were placed in a 100 ml round-bottomed flask at room temperature. 9.6 g of an NaOH solution at 25% by mass were then added. The flask was then heated at 60° C. for 24 hours. The polymer solution thus obtained was precipitated from 250 mL of MeOH, redissolved in 10 mL of water and reprecipitated from 100 mL of MeOH. The polymer thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 18 angle detector gives the following mass-average molar mass value ($M_w$): 81 400 g/mol.

Example 7

Poly(Acrylamide/LA) 97.5/2.5 mol % nH 6.3 Mnth 250 000 g/mol 25 g of solution C, 6.522 g of acrylamide (aqueous solution at 50% by mass), 0.283 g of Rhodixan A1 (ethanolic solution at 1.0% by mass) and 1.6 g of ammonium persulfate (aqueous solution at 1.0% by mass) were placed in a 50 mL glass flask, at room temperature (20° C.). The mixture was degassed by sparging with nitrogen for 20 minutes. 1.6 g of sodium formaldehyde sulfoxylate in the form of an aqueous solution at 1.0% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 95% conversion was obtained (determined by HPLC assay of the residual acrylamide).

The gel thus obtained was subjected to a basic hydrolysis. 15.0 g of gel and 25.0 g of distilled water were placed in a 100 ml round-bottomed flask at room temperature. 9.6 g of an NaOH solution at 25% by mass were then added. The flask was then heated at 60° C. for 24 hours. The polymer solution thus obtained was precipitated from 250 mL of EtOH, redissolved in 10 mL of water and reprecipitated from 200 mL of EtOH. The polymer thus obtained was analysed by steric exclusion chromatography.

An analysis by steric exclusion chromatography in water supplemented with 100 mM NaCl, 25 mM NaH$_2$PO$_4$, 25 mM Na$_2$HPO$_4$ pH 7 buffer solution with a Malls 18 angle detector gives the following mass-average molar mass value ($M_w$): 310 000 g/mol.

Example 8

Poly(Acrylamide/LMA) 97.5/2.5 mol % nH 6.3 Mnth 10 000 g/mol 50 g of solution B, 13.07 g of acrylamide (aqueous solution at 50% by mass), 0.135 g of Rhodixan A1 and 6.28 g of ammonium persulfate (aqueous solution at 0.5% by mass) were placed in a 250 mL round-bottomed flask, at room temperature (20° C.). The mixture was degassed by sparging with nitrogen for 30 minutes. 6.28 g of sodium formaldehyde sulfoxylate in the form of an aqueous solution at 0.5% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 46% conversion was obtained (determined by $^1$H NMR).

The gel thus obtained was subjected to a basic hydrolysis. 25.0 g of gel and 27.4 g of distilled water were placed in a 100 ml round-bottomed flask at room temperature. 9.6 g of an NaOH solution at 25% by mass were then added. The flask was then heated at 60° C. for 24 hours. The polymer solution thus obtained was precipitated from 250 mL of MeOH, redissolved in 10 mL of water and reprecipitated from 100 mL of MeOH. The polymer thus obtained was analysed by steric exclusion chromatography.

An analysis by steric exclusion chromatography in water supplemented with 100 mM NaCl, 25 mM NaH$_2$PO$_4$, 25 mM $Na_2HPO_4$ pH 7 buffer solution with a Malls 3 angle detector gives the following mass-average molar mass value ($M_W$): 109 900 g/mol.

Example 9

Poly(Acrylamide/LMA) 97.5/2.5 mol % nH 6.3
Mnth 250 000 g/mol 25 g of solution B, 6.530 g of acrylamide (aqueous solution at 50% by mass), 0.277 g of Rhodixan A1 (ethanolic solution at 1.0% by mass) and 1.6 g of ammonium persulfate (aqueous solution at 1.0% by mass) were placed in a 50 mL glass flask, at room temperature (20° C.). The mixture was degassed by sparging with nitrogen for 20 minutes. 1.6 g of sodium formaldehyde sulfoxylate in the form of an aqueous solution at 1.0% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 93% conversion was obtained (determined by HPLC assay of the residual acrylamide).

The gel thus obtained was subjected to a basic hydrolysis. 15.0 g of gel and 25.0 g of distilled water were placed in a 100 ml round-bottomed flask at room temperature. 9.6 g of an NaOH solution at 25% by mass were then added. The flask was then heated at 60° C. for 24 hours. The polymer solution thus obtained was precipitated from 250 mL of EtOH, redissolved in 10 mL of water and reprecipitated from 200 mL of EtOH. The polymer thus obtained was analysed by steric exclusion chromatography.

An analysis by steric exclusion chromatography in water supplemented with 100 mM NaCl, 25 mM $NaH_2PO_4$, 25 mM $Na_2HPO_4$ pH 7 buffer solution with a Malls 18 angle detector gives the following mass-average molar mass value ($M_W$): 357 000 g/mol.

Example 10

Poly(Acrylamide/LMAM) 97.5/2.5 mol % nH 6.3
Mnth 10 000 g/mol 50.0 g of solution D, 13.0 g of acrylamide (aqueous solution at 50% by mass) and 0.146 g of Rhodixan A1 were mixed in a 150 mL plastic bottle. 5 mL of this solution were placed in a 5 mL glass flask. 0.3 mL of an ammonium persulfate solution (aqueous solution at 5.0% by mass) and 0.3 mL of sodium formaldehyde sulfoxylate in the form of an aqueous solution at 0.25% by mass were added. The mixture was degassed by sparging with nitrogen for 5 minutes.

The polymerization reaction was then left to proceed without stirring for 16 hours at room temperature (20° C.).

After the 16 hours of reaction, 97% conversion was obtained (determined by HPLC assay of the residual acrylamide).

The polymer was precipitated from 15 mL of ethanol and then redissolved in 15 mL of water, to which was added 1 g of NaOH, This solution was then left to react for 72 hours, and the polymer was then precipitated from 50 mL of ethanol. The polymer thus obtained was analysed by steric exclusion chromatography.

An analysis by steric exclusion chromatography in water supplemented with 100 mM NaCl, 25 mM $NaH_2PO_4$, 25 mM $Na_2HPO_4$ pH 7 buffer solution with a Malls 18 angle detector gives the following mass-average molar mass value ($M_W$): 25 600 g/mol.

Example 11

Poly(Acrylamide/LMAM) 97.5/2.5 mol % nH 6.3
Mnth 500 000 g/mol 100 g of solution D, 26.0 g of acrylamide (aqueous solution at 50% by mass), 0.541 g of Rhodixan A1 (ethanolic solution at 1.0% by mass) and 6.24 g of ammonium persulfate (aqueous solution at 1.0% by mass) were placed in a 250 mL round-bottomed, flask, at room temperature (20'C). The mixture was degassed by sparging with nitrogen for 30 minutes. 6.26 g of sodium formaldehyde sulfoxylate in the form of an aqueous solution at 1.0% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 90.3% conversion was obtained (determined by HPLC assay of the residual acrylamide).

The gel thus obtained could not be hydrolyzed on account of the resistance of the methacrylamide group to hydrolysis.

Example 12

Poly(Acrylamide/AMPS/LMAM) 79.6/19.9/0.5 mol % nH 4.0 Mnth 500 000 g/mol 30.3 g of solution E, 69.9 g of water, 20.8 g of acrylamide (aqueous solution at 50% by mass), 16.3 g of AMPS (aqueous solution at 50% by mass), 0.540 g of Rhodixan A1 (ethanolic solution at 1.0% by mass) and 6.00 g of ammonium persulfate (aqueous solution at 5.0% by mass) were placed in a 250 mL round-bottomed flask, at room temperature (20° C.). The mixture was degassed by sparging with nitrogen for 20 minutes. 1.5 g of sodium formaldehyde sulfoxylate in the form of an aqueous solution at 1.0% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 64.6% conversion was obtained (determined by HPLC assay of the residual acrylamide and AMPS).

The gel thus obtained could not be hydrolyzed on account of the resistance of the methacrylamide group to hydrolysis.

Example 13

Poly(Acrylamide/AMPS/LMAM) 79.6/19.9/0.5 mol % nH 4.0 Mnth 500 000 g/mol 30.3 g of solution E, 69.7 g of water, 20.8 g of acrylamide (aqueous solution at 50% by mass), 16.3 g of AMPS (aqueous solution at 50% by mass), 1.111 g of mercaptoethanol (aqueous solution at 0.5% by mass) and 6.00 g of ammonium persulfate (aqueous solution at 5.0% by mass) were placed in a 250 mL round-bottomed flask, at room temperature (20° C.). The mixture was degassed by sparging with nitrogen for 20 minutes. 1.5 g of sodium formaldehyde sulfoxylate in the form of an aqueous solution at 1.0% by mass were added to the medium, in a single portion. The mixture was degassed by sparging with nitrogen for 15 minutes.

The polymerization reaction was then left to proceed with stirring for 16 hours at room temperature (20° C.).

After the 16 hours of reaction, 80.7% conversion was obtained (determined by HPLC assay of the residual acrylamide and AMPS).

The gel thus obtained could not be hydrolyzed on account of the resistance of the methacrylamide group to hydrolysis.

Example 14

Polymer Solution Filterability

The polymers derived from Example 12 (synthesis controlled with a reversible transfer agent) and Example 13 (irreversible transfer agent) were dissolved at 0.2% active polymer in an aqueous potassium chloride solution at 1% by mass (solution prepared from 10 g of KCl made up to 1 kg with deionized water). The solutions were stirred magnetically for 24 hours and then conditioned for 6 hours at 60° C. to ensure the maximum possible dissolution or dispersion.

A filterability test was performed, which consists in passing the solution to be used for flushing the porous medium through a ceramic filter of known porosity. The ceramic disks used here have a thickness of 6.2 mm and a permeability of 775 mD (measured by mercury permeability/injectivity), i.e. pore sizes of 10 μm on average (these disks are available from OFITE under the reference 170-55).

In a stainless-steel filter cell (available from OFITE under the reference 170-46: HTHP double end assembly for ceramic disks) able to contain 175 mL of solution, are placed 100 mL of 0.2% polymer solution. The temperature is stabilized at 60° C. for 15 minutes before starting the filtration test.

A nitrogen pressure of 0.35 bar is applied and the mass collected at the filter outlet is recorded as a function of time.

Figure 2:
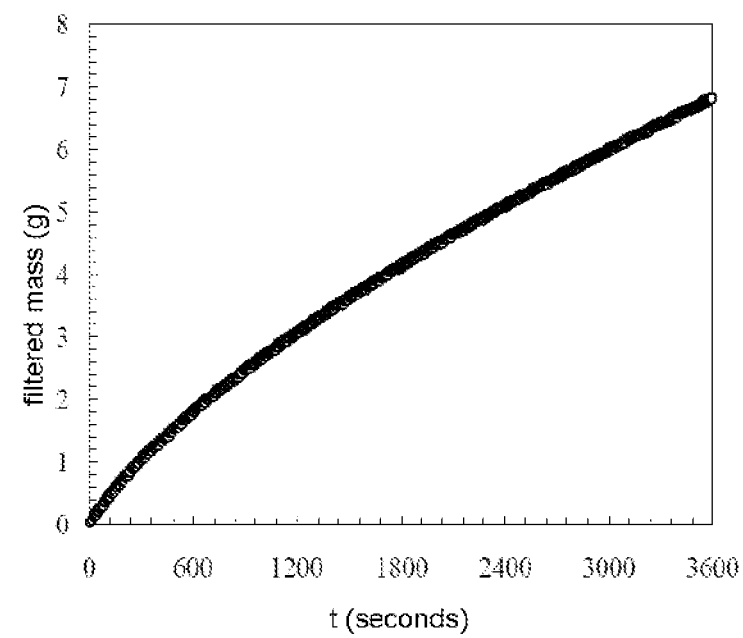

The change in collected masses as a function of time for the solutions containing 0.2% of polymers of Examples 12 and 13 during filtration at 60° C. (referred to as the filtered masses) is given in the appended FIGS. 1 and 2.

During this test, it is very clearly seen that the polymer of Example 12 is injectable into a porous medium. The collected mass increases linearly. There is no accumulation or clogging of the filter with the polymer and all the solution can be filtered in less than 2 minutes. In contrast, the polymer of Example 13 shows a typical profile of clogging of the filter and of accumulation of a filter cake on the filter with a rate of passage of fluid which decreases as a function of time. Moreover, it is not possible to filter all of the solution within a reasonable time and the test is stopped after one hour with less than 10% of the solution filtered. Finally, during the dismantling of the cell, a gel filter cake about 2 mm thick is observed on the filter.

In the light of this example, the advantage of controlling the polymerization with a reversible control agent is clearly seen in the context of using polymer solutions for flushing a porous medium.

The invention claimed is:

1. A process for preparing a block copolymer, which comprises a step (E) of micellar radical polymerization in which the following are placed in contact, in an aqueous medium (M):

hydrophilic monomers, dissolved or dispersed in said aqueous medium (M);
hydrophobic monomers in the form of a micellar solution, i.e. containing, in dispersed form in the medium (M), micelles comprising these hydrophobic monomers;
at least one radical polymerization initiator, and
at least one radical polymerization control agent, in which the radical polymerization control agent is a compound comprising a thiocarbonylthio group —S(C=S)—.

2. The process as claimed in claim 1, in which the thiocarbonylthio group —S(C=S)— has a formula —SC=S—O—.

3. The process as claimed in claim 1, wherein the radical polymerization control agent compound comprising the thiocarbonylthio group —S(C=S)— is an oligomer of water-soluble or water-dispersible nature bearing the thiocarbonylthio group —S(C=S)—, and
is soluble or dispersible in the aqueous medium (M) used in step (E); and/or
is not capable of penetrating into the micelles of the micellar solution.

4. The process as claimed in claim 3, wherein the radical polymerization control agent is a prepolymer bearing the thiocarbonylthio group —S(C=S)—, obtained after a step (E⁰), prior to said step (E), said step (E⁰) placing the following in contact:
hydrophilic monomers identical in formula to said hydrophilic monomers used in step E;
said radical polymerization initiator; and
a radical pre-polymerization control agent bearing the thiocarbonylthio group —S(C=S)—.

5. The process as claimed in claim 1, wherein the hydrophilic monomers of said step (E) comprise (meth)acrylic acid and/or acrylamido or methacrylamido monomers.

6. The process as claimed in claim 5, wherein the hydrophilic monomers of said step (E) are (meth)acrylamides.

7. The process as claimed in claim 1, wherein the radical polymerization initiator used in said step (E) is a redox initiator.

8. The process as claimed in claim 7, wherein the redox initiator comprises a combination of ammonium persulfate and sodium formaldehyde sulfoxylate.

9. The process as claimed in claim 1, wherein the reaction medium of said step (E) is free of copper or comprises copper in combination with a copper-complexing agent, in an amount capable of masking its presence.

10. The process as claimed in claim 1, wherein the process of the invention comprises, after said step (E), a step (E1) of hydrolysis, ozonolysis or reaction with amines, which is capable of deactivating and/or destroying all or some transfer groups present on the polymer prepared in said step (E) resulting from the radical polymerization control agent of step (E).

11. The process as claimed in claim 4, wherein the prepolymer has a polymer chain of 2 to 15 said hydrophilic monomer units.

12. The process as claimed in claim 1, wherein the radical pre-polymerization control agent of step E₀ has a formula (A):

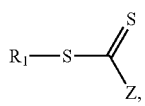

(A)

wherein

Z represents:
- a hydrogen atom,
- a chlorine atom,
- an optionally substituted alkyl or optionally substituted aryl radical,
- an optionally substituted heterocycle,
- an optionally substituted alkylthio radical,
- an optionally substituted arylthio radical,
- an optionally substituted alkoxy radical,
- an optionally substituted aryloxy radical,
- an optionally substituted amino radical,
- an optionally substituted hydrazine radical,
- an optionally substituted alkoxycarbonyl radical,
- an optionally substituted aryloxycarbonyl radical,
- an optionally substituted carboxyl or acyloxyl radical,
- an optionally substituted aryloxy radical,
- an optionally substituted carbamoyl radical, a cyano radical,
- a dialkyl- or diaryl-phosphonato radical, a dialkyl-phosphinato or diaryl-phosphinato radical, or
- a polymer chain, and $R_1$ represents an optionally substituted alkyl, acyl, aryl, aralkyl, alkene or alkyne group containing 1 to 20 carbon atoms,
  wherein the groups $R_1$ and Z, when they are substituted, are independently substituted with a member of the group consisting of
  optionally substituted phenyl groups, optionally substituted aromatic groups, saturated or unsaturated carbocycles, saturated or unsaturated heterocycles, alkoxycarbonyl or aryloxycarbonyl of formula —COOR, carboxyl of formula —COOH, acyloxy of formula —O$_2$OR, carbamoyl of formula —CONR$_2$, cyano of formula —CN, alkylcarbonyl, alkylarylcarbonyl, arylcarbonyl, arylalkylcarbonyl, phthalimido, maleimido, succinimido, amidino, guanidimo, hydroxyl of formula —OH, amino of formula —NR$_2$, halogen, perfluoroalkyl $C_nF_{2n+1}$, allyl, epoxy, alkoxy of formula —OR, S-alkyl, S-aryl, groups of hydrophilic or ionic nature selected from alkali metal salts of carboxylic acids, alkali metal salts of sulfonic acid, polyalkylene oxide chains of formula PEO and/or PPO, cationic substituents selected from quaternary ammonium salts, wherein R of the aryloxycarbonyl, acyloxy, carbamoyl, amino, and alkoxy representing an alkyl or an aryl group, or a polymer chain.

13. The process as claimed in claim 1, in which the thiocarbonylthio group —S(C═S)— has a formula —S(C═S)OCH$_2$CH$_3$.

14. The process as claimed in claim 1, in which the radical polymerization control agent compound has a formula $R_1$—S(C═S)OCH$_2$CH$_3$, wherein $R_1$ represents an optionally substituted alkyl group, wherein when the group $R_1$ is substituted, it is substituted with a member of the group consisting of alkoxycarbonyl or aryloxycarbonyl of formula —COOR, carboxyl of formula —COOH.

15. The process as claimed in claim 1, wherein the radical polymerization control agent compound comprising the thiocarbonylthio group —S(C═S)— has a formula (A):

wherein

Z represents an alkoxy radical, $R_1$ represents an optionally substituted alkyl group, wherein when the group $R_1$ is substituted, it is substituted with a member of the group consisting of alkoxycarbonyl or aryloxycarbonyl of formula —COOR, carboxyl of formula —COOH.

16. A process for preparing a block copolymer, which comprises a step (E) of micellar radical polymerization in which the following are placed in contact, in an aqueous medium (M): —hydrophilic monomers, dissolved or dispersed in said aqueous medium (M); —hydrophobic monomers in the form of a micellar solution, i.e. containing, in dispersed form in the medium (M), micelles comprising these hydrophobic monomers; —at least one radical polymerization initiator, and —at least one radical polymerization control agent, wherein the radical polymerization control agent is a prepolymer bearing the thiocarbonylthio group —S(C═S)—, obtained after a step (E°), prior to said step (E), said step (E°) placing the following in contact: —hydrophilic monomers identical in formula to said hydrophilic monomers used in step E; —said radical polymerization initiator; and a radical pre-polymerization control agent bearing the thiocarbonylthio group —S(C═S)—, wherein the radical polymerization initiator used in said step (E) is a redox initiator comprising a combination of ammonium persulfate and sodium formaldehyde sulfoxylate.

* * * * *